US012627968B2

(12) United States Patent　　　　(10) Patent No.:　US 12,627,968 B2
Liu　　　　　　　　　　　　　　　　　　(45) Date of Patent:　　May 12, 2026

(54) COMMUNICATION METHOD AND RELATED DEVICE

(71) Applicant: GREATER SHINE LIMITED, New Taipei City (TW)

(72) Inventor: Haizhou Liu, Beijing (CN)

(73) Assignee: GREATER SHINE LIMITED, New Taipei City (TW)

( * ) Notice: Subject to any disclaimer, the term of this patent is extended or adjusted under 35 U.S.C. 154(b) by 333 days.

(21) Appl. No.: 18/399,024

(22) Filed: Dec. 28, 2023

(65) Prior Publication Data

US 2025/0056202 A1　Feb. 13, 2025

(30) Foreign Application Priority Data

Aug. 10, 2023　(CN) ......................... 202311008997.0

(51) Int. Cl.
*H04W 8/18*　　　(2009.01)
*H04W 24/10*　　(2009.01)

(52) U.S. Cl.
CPC .............. *H04W 8/18* (2013.01); *H04W 24/10* (2013.01)

(58) Field of Classification Search
CPC ....... H04W 8/18; H04W 24/10; H04W 8/183; H04W 24/02; H04W 48/16; H04W 76/19; H04W 88/06
See application file for complete search history.

(56) References Cited

U.S. PATENT DOCUMENTS

2016/0302114 A1* 10/2016 Jain ..................... H04W 36/304
2022/0141723 A1* 5/2022 Patankar ............... H04W 24/02
455/436

* cited by examiner

*Primary Examiner* — Vladimir Magloire
(74) *Attorney, Agent, or Firm* — BAYES PLLC

(57)　　　　　　　ABSTRACT
Provided are a communication method and related device. The method is applied to a terminal device including a first Subscriber Identity Module (SIM) card and a second SIM card. A request for first service is received from the first SIM card; in response to the first SIM card needing to preempt a radio frequency resource used by the second SIM card, a measurement cell set of the second SIM card is sent to the first SIM card; a first measurement is performed using the first SIM card and a first measurement report is generated, the first measurement including a measurement performed based on the measurement cell set of the second SIM card; the first measurement report is sent to the second SIM card after execution of the first service is completed; and a current serving cell of the second SIM card is determined according to the first measurement report.

20 Claims, 8 Drawing Sheets

100

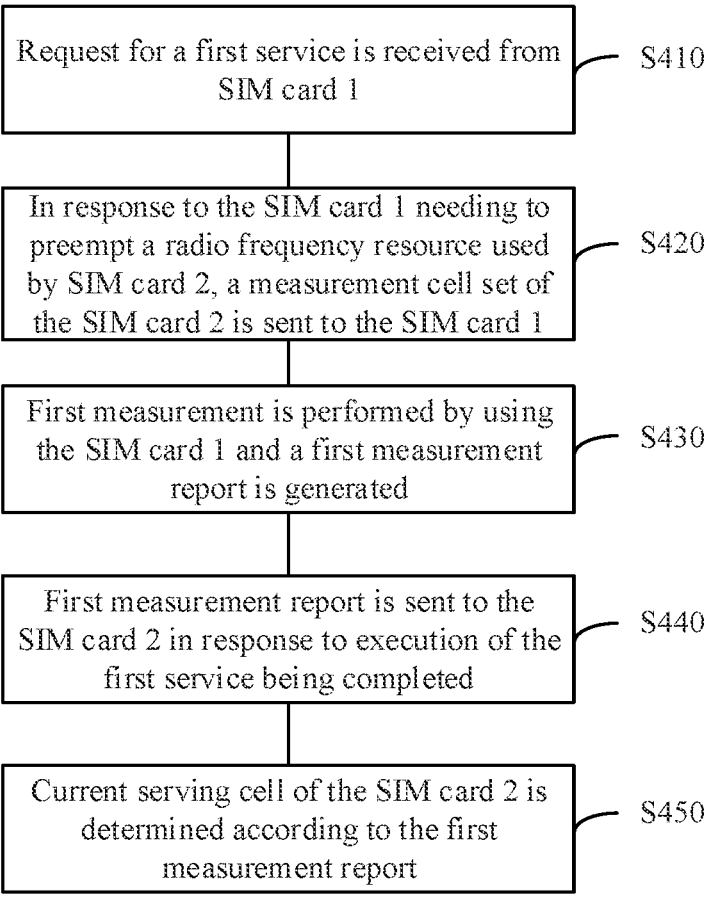

Request for a first service is received from SIM card 1 — S410

In response to the SIM card 1 needing to preempt a radio frequency resource used by SIM card 2, a measurement cell set of the SIM card 2 is sent to the SIM card 1 — S420

First measurement is performed by using the SIM card 1 and a first measurement report is generated — S430

First measurement report is sent to the SIM card 2 in response to execution of the first service being completed — S440

Current serving cell of the SIM card 2 is determined according to the first measurement report — S450

FIG. 4

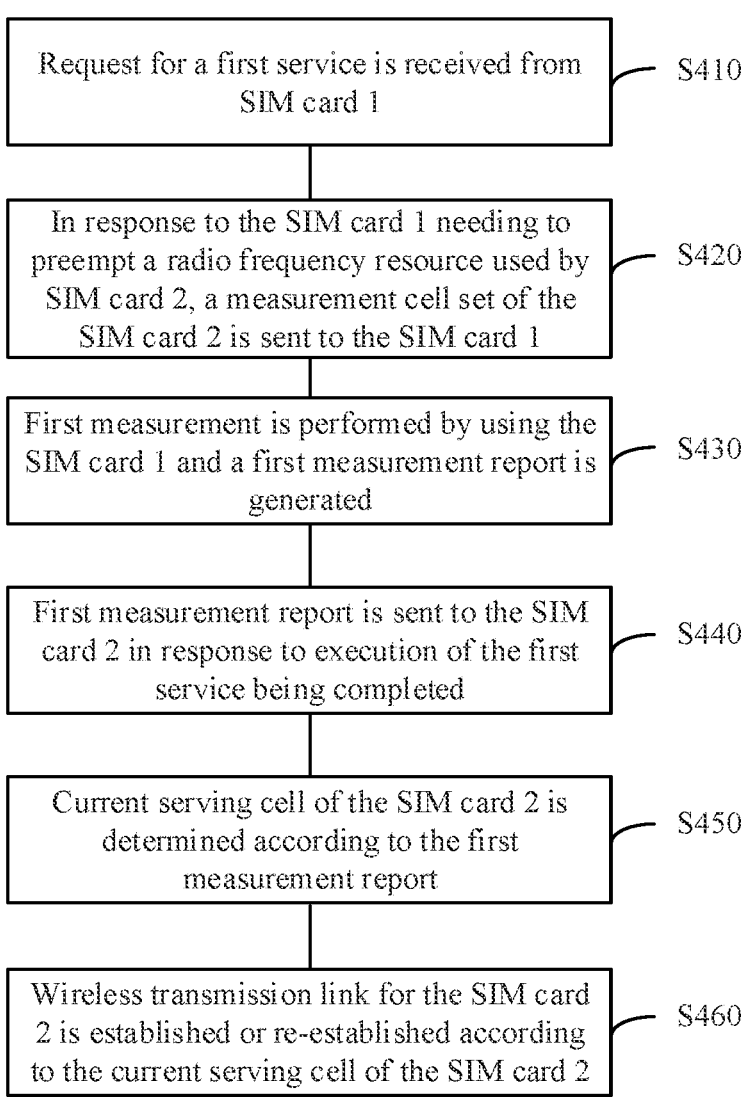

Request for a first service is received from SIM card 1 — S410

In response to the SIM card 1 needing to preempt a radio frequency resource used by SIM card 2, a measurement cell set of the SIM card 2 is sent to the SIM card 1 — S420

First measurement is performed by using the SIM card 1 and a first measurement report is generated — S430

First measurement report is sent to the SIM card 2 in response to execution of the first service being completed — S440

Current serving cell of the SIM card 2 is determined according to the first measurement report — S450

Wireless transmission link for the SIM card 2 is established or re-established according to the current serving cell of the SIM card 2 — S460

FIG. 5

COMMUNICATION METHOD AND RELATED DEVICE

CROSS-REFERENCE TO RELATED APPLICATIONS

This application claims the benefit of priority to Chinese Application No. 202311008997.0, filed on Aug. 10, 2023, the contents of which are incorporated by reference in its entirety.

TECHNICAL FIELD

Embodiments of the present disclosure relate to the field of communication technologies, and more particularly to a communication method and a related device.

BACKGROUND

With the development of communication technology, the multi-Subscriber Identity Module (SIM) multi-standby terminal device has been widely used. The multi-SIM multi-standby terminal device usually is a terminal device including at least two SIM cards. For example, the multi-SIM multi-standby terminal device may include a first SIM card and a second SIM card.

In some scenarios, the first SIM card needs to preempt radio frequency resources of the terminal device to execute related services of the first SIM card, and the radio frequency resources will be released after the execution of the related services of the first SIM card is completed, so as to facilitate the second SIM card to access the wireless network, thereby implementing the wireless communication of the second SIM card.

However, in the related technology, after the execution of the related services of the first SIM card is completed, the second SIM card takes a long time to access the wireless network, which results in poor user experience.

SUMMARY

Embodiments of the present disclosure provide a communication method and a related device. Various aspects of the embodiments of the present disclosure are described below.

In a first aspect, there is provided a communication method applied to a terminal device including a first Subscriber Identity Module (SIM) card and a second SIM card. The method includes: receiving a request for a first service from the first SIM card; in response to the first SIM card needing to preempt a radio frequency resource used by the second SIM card, sending a measurement cell set of the second SIM card to the first SIM card; performing a first measurement by using the first SIM card and generating a first measurement report, where the first measurement includes a measurement performed based on the measurement cell set of the second SIM card; sending the first measurement report to the second SIM card in response to execution of the first service being completed; and determining a current serving cell of the second SIM card according to the first measurement report.

In a second aspect, there is provided a terminal device including a processor and a transceiver, where the processor cooperates with the transceiver to control the terminal device to perform the method as described in the first aspect.

In a third aspect, there is provided a computer-readable storage medium having executable codes stored thereon, where the executable codes, when executed, enable to perform the method as described in the first aspect.

BRIEF DESCRIPTION OF THE DRAWINGS

FIG. 4 is a schematic flowchart of a communication method according to an embodiment of the present disclosure.

FIG. 5 is a schematic flowchart of a communication method according to another embodiment of the present disclosure.

DETAILED DESCRIPTION

Technical solutions of the embodiments of the present disclosure will be clearly and completely described below in combination with the accompanying drawings of the embodiments of the present disclosure. It is apparent that the described embodiments are only part, rather than all, of the embodiments of the present disclosure.

Communication System Architecture

The technical scheme of the embodiments of the present disclosure may be applied to various communication systems, such as Global System of Mobile Communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunications System (UMTS), Wireless Local Area Network (WLAN), Wireless Fidelity (Wi-Fi), 5th-Generation (5G) system or other communication systems, such as future communication systems, such as 6th-Generation mobile communication system, and satellite communication system.

The communication system in embodiments of the present disclosure may be applied to a Carrier Aggregation (CA) scenario, a Dual Connectivity (DC) scenario, or a Standalone (SA) networking scenario.

The communication system in the embodiments of the present disclosure may be applied to an unlicensed spectrum, and the unlicensed spectrum may also be considered as a shared spectrum. Optionally, the communication system in the embodiments of the present disclosure may also be applied to a licensed spectrum, and the licensed spectrum may also be considered as a dedicated spectrum.

The embodiments of the present disclosure may be applied to the NTN system and the terrestrial networks (TN) system. By way of example and not limitation, an NTN system includes an NR-based NTN system and an Internet of Things (IoT)-based NTN system.

Figure 1:
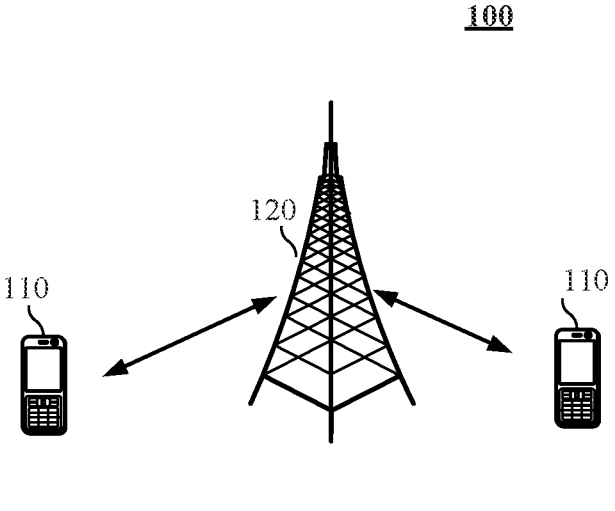
FIG. 1 is a schematic system architecture diagram of a communication system to which embodiments of the present disclosure may be applied.

FIG. 1 is a schematic architecture diagram of a communication system to which embodiments of the present disclosure may be applied. As shown in FIG. 1, the communication system 100 may include a terminal device 110 and a network device 120.

The terminal device 110 may also be called as User Equipment (UE), an access terminal, a subscriber unit, a subscriber station, a Mobile Station (MS), a Mobile Terminal (MT), a remote station, a remote terminal, a mobile device, a user terminal, a terminal, a wireless communication device, a user agent or a user device, etc.

In the embodiments of the present disclosure, the terminal device 110 may include multiple SIM cards for communication and therefore the terminal device 110 may also be called as a multi-SIM terminal device or a multi-SIM multi-standby terminal device.

The type of the terminal device 110 is not specifically limited in the embodiments of the present disclosure. For example, the terminal device 110 may be a STATION (ST) in a WLAN, a cellular telephone, a cordless telephone, a Session Initiation Protocol (SIP) telephone, a Wireless Local Loop (WLL) station, a Personal Digital Assistant (PDA) device, a handheld device having a wireless communication function, a computing device or other processing device connected to a wireless modem, a vehicle-mounted device, a wearable device, a terminal device in a next generation communication system such as in an NR network, or a terminal device in a future evolved Public Land Mobile Network (PLMN) network, etc.

The network device 120 may be a Radio Access Network (RAN) node (or device) that connects the terminal device 110 to a wireless network, and the network device 120 may provide a network for the terminal device 120. For example, the network device 120 may be a base station. The base station may broadly cover or be replaced with following names, such as, Node B (NodeB), evolved NodeB (eNB), next generation NodeB (gNB), relay station, access point, Transmitting and Receiving Point (TRP), Transmitting Point (TP), Master eNB (MeNB), Secondary eNB (SeNB), Multi-RAT (MSR) node, home base station, network controller, access node, wireless node, Access Point (AP), transmission node, transceiver node, Base Band Unit (BBU), Remote Radio Unit (RRU), Active Antenna Unit (AAU), Remote Radio Head (RRH), Central Unit (CU), Distributed Unit (DU), positioning node, etc. The base station may be a macro base station, a micro base station, a relay node, a donor node, etc. or a combination thereof. The base station may also be a communication module, a modem or a chip provided inside the device or apparatus. The base station may also be a mobile switching center and a device that undertakes a function of the base station in Device-to-Device (D2D) communication, Vehicle-to-Everything (V2X) communication, Machine-to-Machine (M2M) communication, a device in network side in a 6G network, a device that undertakes a function of the base station in a future communication system, etc. The base station may support networks with the same technology or different access technologies.

In the embodiment of the present disclosure, the network device 120 may provide a service for a cell, and the terminal device 110 communicates with the network device 120 by using transmission resources (e.g. frequency resources, or spectrum resources) through accessing to the cell. The cell may be a cell corresponding to the network device 120 (e.g. base station), and the cell may belong to a macro base station or a base station corresponding to a small cell. The small cell may include a metro cell, a micro cell, a pico cell, a femto cell, etc. These small cells have characteristics of small coverage and low transmission power, and these small cells are suitable for providing a high-speed data transmission service.

FIG. 1 exemplarily illustrates one network device 120 and two terminal devices 110. In some embodiments of the present disclosure, the communication system 100 may include multiple network devices 120 and other numbers of terminal devices 110 may be included within the coverage of each network device 120, which is not limited by the embodiments of the present disclosure.

As described previously, the multi-SIM multi-standby terminal device may include the first SIM card and the second SIM card. The first SIM card and the second SIM card may access the same serving cell or different serving cells, so that the first SIM card and the second SIM card are simultaneously in a standby state. In this way, users may make and answer calls or send and receive text messages at will without handover of networks.

The SIM card is a subscriber identity module used for uniquely identifying a mobile subscriber in a wireless communication system. The SIM card stores user's data, an authentication method and a key that are used for the communication network to authenticate the user's identity. Moreover, the user implements connection and information exchange with the communication system through the SIM card. The terminal device needs to be equipped with the SIM card to be identified by the network, thereby completing the network registration and implementing the wireless communication.

It should be noted that in FIG. 2 to FIG. 6, in order to simplify the illustration, the first SIM card is marked as SIM card 1, and the second SIM card is marked as SIM card 2.

For the multi-SIM multi-standby terminal device, due to the limited radio frequency resources of the terminal device, only Single Input Single Output (SISO) or Single Input Multiple Output (SIMO) may be supported, but the pure Multiple Input Multiple Output (MIMO) is not supported. In other words, the multi-SIM multi-standby terminal device cannot simultaneously perform, through multiple SIM cards, uplink data services and downlink data services on multiple networks in one-to-one correspondence to the multiple SIM cards. Therefore, the multi-SIM multi-standby terminal device may only perform the services of one SIM card at a certain moment.

In some scenarios, the first SIM card needs to preempt a radio frequency resource of the terminal device that is used by the second SIM card to perform related services of the first SIM card, and the radio frequency resource will be released after the execution of the related services of the first SIM card is completed, so as to facilitate the second SIM card to continue accessing the wireless network, thereby implementing restoration of the wireless communication of the second SIM card.

Figure 2:
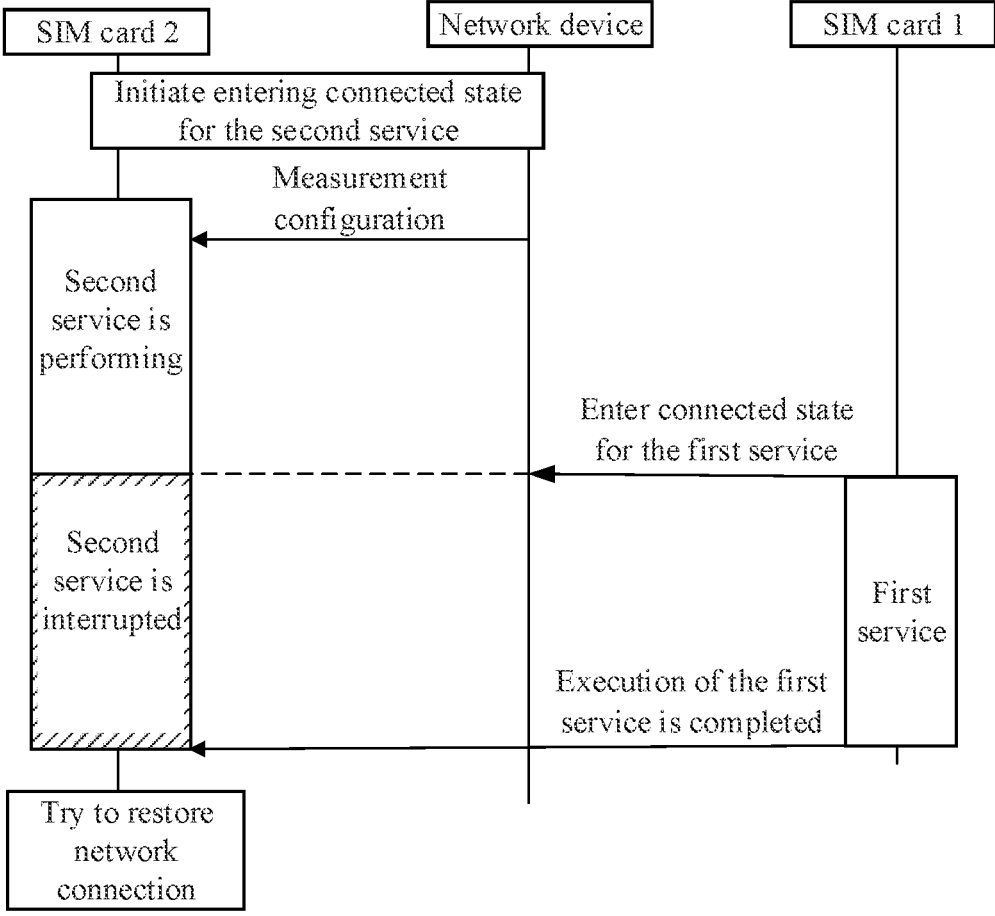
FIG. 2 is a schematic diagram of an application scenario to which a communication method in the related art.

For example, as shown in FIG. 2, one of the scenarios may be as follows. In response to a request for the second service, the second SIM card communicates with the network device by using the radio frequency resource, so that the second SIM card enters connected state, and the second SIM card starts to perform the second service after entering the connected state. In the process of performing the second service, the terminal device receives a request for a first service from the first SIM card. If a priority of the first service is higher than a priority of the second service, the terminal device causes the first SIM card to preempt the radio frequency resource used by the second SIM card, so that the first SIM card enters the connected state, and thus the first service may be prioritized (for example, the first service is a call service and the second service is a game service). After the execution of the first service of the first SIM card is completed, the radio frequency resource is released so as to facilitate the second SIM card to restore the network connection.

Optionally, the scenario may be that the second SIM card is a primary card and the first SIM card is a secondary card. The primary card may be understood as a default card connected to the network. The second SIM card also needs to use the radio frequency resource when the second SIM card is in a non-service state (e.g. the non-service state may be an idle state (IDLE) or an inactive state), so as to camp on an optimal cell to ensure the high efficiency for the second SIM card to access the wireless network. If the first SIM card needs to process a service of the first SIM card at this time, the first SIM card will still preempt the radio frequency resource used by the second SIM card to process the service of the first SIM card. After the execution of the service of the first SIM card is completed, the radio frequency resource is released so as to facilitate the second SIM card to restore the network connection.

It should be noted that when the second SIM card performs the second service or is in the non-service state, the second SIM card may also perform the cell measurement based on a measurement configuration sent by the network device, so as to ensure the quality of network to which it has access. The measurement configuration includes a measurement cell set (or called as a measurement target list) of the second SIM card. The measurement cell set of the second SIM card may include an identity (ID) of a serving cell of the second SIM card and IDs of neighbor cells of the serving cell. In some embodiments, the neighbor cells of the serving cell may be simply called as the neighbor cells. It should be noted that after the first SIM card preempts the radio frequency resource, the second SIM card cannot implement the cell measurement.

Possible implementations for the second SIM card restoring the network connection are described below in conjunction with the exemplary description of FIG. 3.

Figure 3:
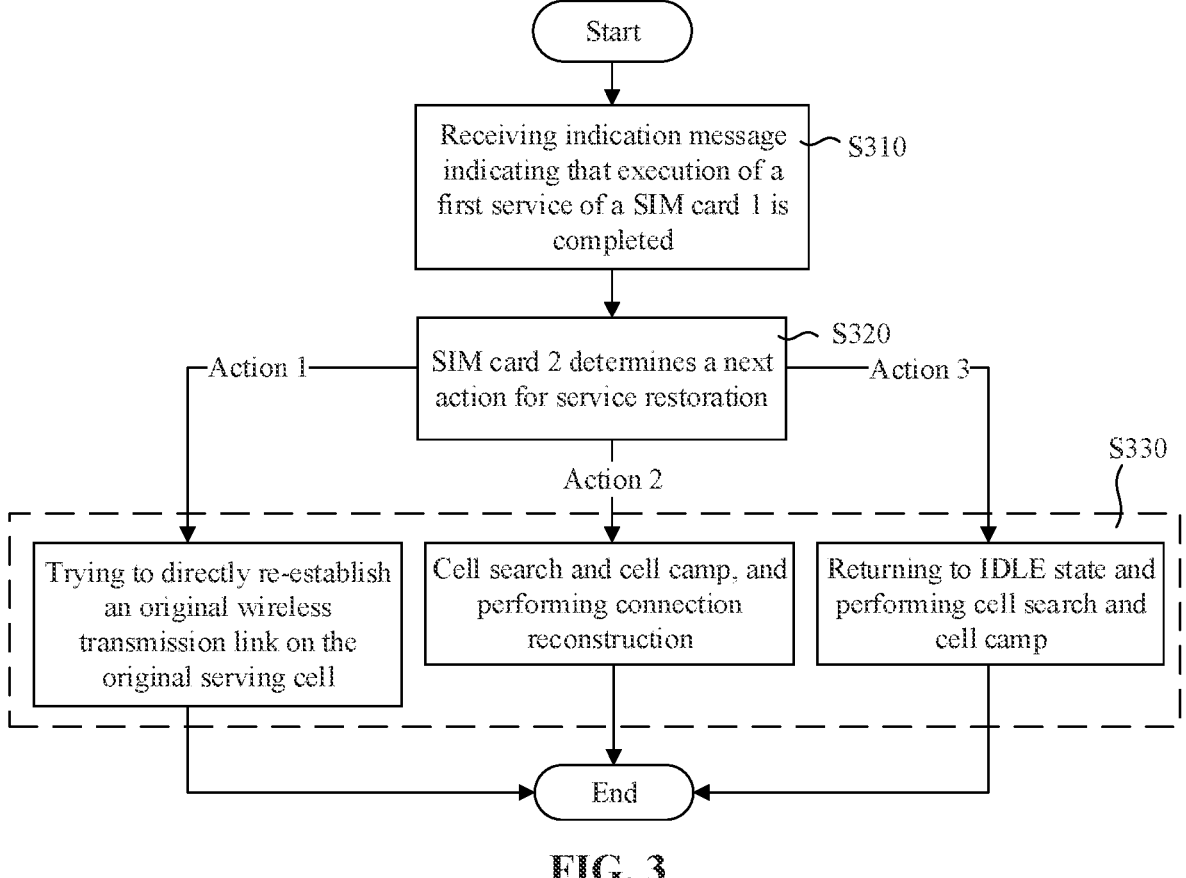
FIG. 3 is a schematic flowchart of a method for a second SIM card to access a network after execution of a first service is completed in the related art.

As shown in FIG. 3, the flow for the second SIM card to restore the network connection is as follows.

In operation S310, an indication message indicating that execution of a first service of a first SIM card is completed is received by the second SIM card.

In operation S320, the second SIM card determines a next action for service restoration.

As shown in FIG. 3, the next action for service restoration may include any one of action 1 to action 3. In the action 1, the second SIM card tries to directly re-establish an original wireless transmission link on the original serving cell. In the action 2, the second SIM card tries to perform cell search and cell camp and perform a connection reconstruction. In the action 3, the second SIM card tries to return to IDLE state and perform the cell search and cell camp. The original wireless transmission link may be understood as an uplink and downlink transmission link for wireless communication between the second SIM card and the network device, which is established by the second SIM card using the radio frequency resource before the first service is performed.

The determination criterion of the second SIM card is not specifically limited in the embodiment of the present disclosure, and may be set according to requirements. For example, the second SIM card may determine the next action for service restoration according to a duration of execution of the first service.

In operation S330, the action 1, action 2, or action 3 is performed according to the determination result of operation S320.

However, it takes a long time to search for a current serving cell or establish a wireless transmission link for the second SIM card through the method shown in FIG. 3. In other words, it takes a long time for the second SIM card to access the wireless network through the method shown in FIG. 3, which results in poor user experience.

The reason is that in operation S330, regardless of the second SIM card performing the action 1, action 2, or action 3, the second SIM card performs one of the three actions based on the measurement cell set of the second SIM card. Specifically, in action 1, the second SIM card tries to re-establish the original wireless transmission link before being preempted on a serving cell in the measurement cell set of the second SIM card. The cell search and cell camp in action 2 and action 3 are implemented by performing the network search and cell camp within the coverage of the measurement cell set of the second SIM card.

However, the measurement cell set of the second SIM card is obtained before the first SIM card performs the first service. In the duration between the time when the first SIM card preempts the radio frequency resource to perform the first service and the time when the execution of the first service is completed, the terminal device is likely to move. Therefore, the wireless environment where the terminal device is located will also change. At this time, the signal of the serving cell and/or the signals of the neighbor cells in the measurement cell set of the second SIM card may deteriorate. Therefore, in a case where the second SIM card does not sense the change in the wireless environment, the second SIM card performs one of the action 1, action 2 or action 3 still based on the measurement cell set of the second SIM card, which may increase the time consumption for the second SIM card to access the wireless network, thereby resulting in poor user experience.

It should be noted that, in order to distinguish and understand conveniently, the serving cell and the neighbor cells in the measurement cell set of the second SIM card before the radio frequency resource used by the second SIM card is preempted are called as the original serving cell and the neighbor cells of the original serving cell, respectively.

For example, when the second SIM card performs the action 1, the signal of the original serving cell deteriorates, and the signal is even too poor to normally re-establish the original uplink and downlink transmission link. However, since the terminal device does not sense the deterioration of the signal, the terminal device will first re-establish the original uplink and downlink transmission link according to the normal process. When the execution of the re-establishment is unsuccessful, an indication for Radio Link Failure (RLF) will be triggered. Specifically, the terminal device operates as follows: N310 out of sync indications→start timer T310→T310 expiry→trigger RLF. Furthermore, after the RLF is triggered, the terminal device tries to perform a cell search for the second SIM card to find a suitable cell to camp on. As a result, the second SIM card takes a long time to access the network, thereby resulting in a longer interval for subsequent service restoration.

For another example, when the second SIM card performs the action 2 or the action 3, since the signal of the original serving cell or the signals of the neighbor cells of the original serving cell deteriorate(s), the second SIM card does not need to perform searching for a network to camp on in the measurement cell set of the second SIM card. However, since the terminal device does not sense the deterioration of the signal(s), the terminal device will first search for a network in the measurement cell set of the second SIM card according to the normal operations, which also causes the second SIM card to take a long time to access the network, thereby resulting in a longer interval for subsequent service restoration.

To sum up, in the related technology, the method for connecting the second SIM card to the network after the execution of the related services of the first SIM card is completed spends a long duration, which results in poor user experience.

In view of this, the embodiment of the present disclosure provides a communication method. When the first SIM card preempts the radio frequency resource used by the second SIM card, a cell measurement (i.e. the first measurement) is continued to be performed for the second SIM card by using the first SIM card and a measurement report is generated. Moreover, after the execution of the first service of the first SIM card is completed, a current serving cell of the second SIM card may be determined according to the first measurement report. According to the method, the change in the signal of each cell in the measurement cell set of the second SIM card may be sensed before the second SIM card accesses the network, which can avoid the time consumption increased by invalid network search action, and can effectively improve the efficiency for the second SIM card to access the network after the execution of the first service of the first SIM card is completed, thereby effectively ensuring the use experience of the user.

The communication method in the embodiment of the present disclosure will be described in detail with reference to FIG. 4. The method is applied to the terminal device described above, and the terminal device includes a first SIM card and a second SIM card.

With reference to FIG. 4, the method includes operations S410 to S450.

In operation S410, a request for a first service is received from the first SIM card.

The request for the first service may include a specific content of the first service and a priority of the first service. The terminal device may determine whether the first SIM card needs to preempt the radio frequency resource of the terminal device for the first service according to the request for the first service.

In the embodiment of the present disclosure, the fact that the radio frequency resource of the terminal device is preempted for the first service may be understood as that the second SIM card uses the radio frequency resource before the first service of the first SIM card occupies the radio frequency resource. After the radio frequency resource of the terminal device is preempted for the first service, the second SIM card cannot communicate with the network device.

According to the foregoing, when the second SIM card uses the radio frequency resource, the second SIM card may perform cell measurement for the measurement cell set of the second SIM card and generate a measurement report. After the radio frequency resource is preempted for the first service, the second SIM card cannot continue to perform the cell measurement.

The embodiment of the present disclosure does not specifically limit the determination criterion for preempting the radio frequency resource. For example, it may be determined whether the first SIM card needs to preempt the radio frequency resource of the terminal device for the first service according to the priority of the first service and/or a state of the second SIM card.

As an implementation, as shown in FIG. 2, when a Radio Resource Control (RRC) connection state of the second SIM card is the connected state, it may be determined whether the first SIM card needs to preempt the radio frequency resource of the terminal device for the first service according to whether the priority of the first service is higher than a priority of a second service. Specifically, if the priority of the first service is higher than the priority of the second service, the radio frequency resource used by the second SIM card needs to be preempted by the first SIM card. If the priority of the first service is lower than that of the second service, there is no need to preempt the radio frequency resource used by the second SIM card, i.e., the first service is temporarily not processed.

When the RRC connection state of the second SIM card is the connected state, the second SIM card keeps occupying the radio frequency resource of the terminal device to establish the original wireless transmission link for the second SIM card, and the original wireless transmission link is used for performing the second service. The original wireless transmission link is used for connecting the second SIM card and the original serving cell.

In some embodiments, the original wireless transmission link for the second SIM card is also used for the second SIM card to receive a measurement configuration or a System Information Block (SIB) from the network device.

As another implementation, if the RRC connection state of the second SIM card is the idle state or inactive state, it is determined that the first SIM card needs to preempt the radio frequency resource for the first service.

In operation S420, in response to the first SIM card needing to preempt a radio frequency resource of the terminal device used by the second SIM card, a measurement cell set of the second SIM card is sent to the first SIM card.

The measurement cell set of the second SIM card includes an original serving cell of the second SIM card and neighbor cells of the original serving cell. The number of the neighbor cells of the original serving cell may be multiple. The source of the measurement cell set of the second SIM card is not specifically limited in the embodiments of the present disclosure. As an implementation, the measurement cell set of the second SIM card may be included in a measurement configuration or a SIB received by the second SIM card.

In operation S430, a first measurement is performed by using the first SIM card and a first measurement report is generated.

The first measurement includes a measurement performed by the first SIM card based on the measurement cell set of the second SIM card. The first measurement may be understood as a cell measurement for the second SIM card performed by the first SIM card.

The first measurement report may be a measurement report generated by performing measurement evaluation on each cell in the measurement cell set of the second SIM card. The first measurement report is used for indicating the network environment where the second SIM card is located.

In some embodiments, the first measurement report may include signal quality of an original serving cell in the measurement cell set of the second SIM card. Optionally, the first measurement report may also include signal qualities of neighbor cells of the original serving cell in the measurement cell set of the second SIM card.

The signal quality includes, but is not limited to, at least one of: Reference Signal Received Power (RSRP), Reference Signal Received Quality (RSRQ), Signal to Noise ratio (SNR), or parameter S for cell selection.

In operation S440, the first measurement report is sent to the second SIM card in response to execution of the first service being completed.

In the embodiment of the present disclosure, the first measurement report and the measurement cell set of the second SIM card may be sent through a software interface inside the terminal device.

In operation S450, a current serving cell of the second SIM card is determined according to the first measurement report.

The current serving cell of the second SIM card may be understood as a cell where the second SIM card camps after recapturing the radio frequency resource. In the embodiment of the present disclosure, the first measurement report may be used for an assist in determining the current serving cell identified by the second SIM card, so as to facilitate the speed of network search and camp.

As an example, the first measurement report includes a signal quality of the original serving cell of the second SIM card. The operation that the current serving cell of the second SIM card is determined according to the first measurement report includes: determining whether the signal quality of the original serving cell of the second SIM card satisfies a preset condition (e.g. determining whether the RSRP is greater than a set threshold or whether the parameter S is greater than 0) according to the first measurement report; determining the original serving cell as the current serving cell of the second SIM card in response to the signal quality of the original serving cell of the second SIM card satisfying the preset condition; and determining the current serving cell of the second SIM card among cells other than the original serving cell in response to the signal quality of the original serving cell of the second SIM card not satisfying the preset condition.

By prioritizing the determination of whether the original serving cell may be used as the current serving cell, the invalid action of re-establishing the original wireless transmission link that is caused by poor quality of the original serving cell can be avoided in the scenario where the second SIM card may try to re-establish the original wireless transmission link, and the second SIM card may select to search for a network to camp on; and moreover, searching for the original serving cell again can be avoided in the scenario where a network is searched for to camp on. Therefore, the time consumption for the second SIM card to access the network can be efficiently reduced.

The manner of determining the current serving cell of the second SIM card among cells other than the original serving cell is not specifically limited in the embodiment of the present disclosure. As an implementation, the second SIM card may search among multiple cells other than the original serving cell to find a cell with the best network quality as the current serving cell.

However, due to the large number of the cells other than the original serving cell, the time consumption for the second SIM card to access the network may be increased when performing the network search and camp based on the cells.

In order to reduce the time consumption for the second SIM card to access the network, the first measurement report further includes signal qualities of neighbor cells of the original serving cell of the second SIM card. Based on this, the operation that the current serving cell of the second SIM card is determined among the cells other than the original serving cell may include: determining whether the signal quality of each of the neighbor cells of the original serving cell satisfies a preset condition; in response to the signal qualities of the neighbor cells of the original serving cell satisfying the preset condition, determining the current serving cell of the second SIM card among the neighbor cells of the original serving cell; and in response to the signal qualities of the neighbor cells of the original serving cell not satisfying the preset condition, searching cells other than the original serving cell and the neighbor cells of the original serving cell, and determining the current serving cell of the second SIM card among the cells other than the original serving cell and the neighbor cells of the original serving cell.

Before the network search and camp, through determining the current serving cell of the second SIM card by the signal qualities of the neighbor cells of the original serving cell of the second SIM card in the measurement report, the network search action can be avoided or the network search action in a cell with poor signal can be avoided. Specifically, if the measurement report indicates that there are cells with signal qualities satisfying the preset condition among the neighbor cells of the original serving cell, the cells satisfying the preset condition are ordered, and one of cells which are ordered at the front or the first one cell may be randomly selected to camp on, so that the repeated network search and camp can be avoided, thereby effectively reducing the time consumption for the second SIM card to access the network. If the measurement report indicates that the signal quality of each cell among the neighbor cells of an original serving cell does not satisfy the preset condition, the cells can be ignored for the network search and camp, which effectively reduces the number of networks for the network search, thus effectively reducing the time consumption for the second SIM card to access the network.

According to the communication method in the embodiment of the present disclosure, when the first SIM card preempts the radio frequency resource used by the second SIM card, a cell measurement (i.e. the first measurement) is continued to be performed for the second SIM card by using the first SIM card and a measurement report is generated. Moreover, after the execution of the first service of the first SIM card is completed, the current serving cell of the second SIM card may be determined according to the first measurement report. According to the method, the change in the signal of each cell in the measurement cell set of the second SIM card may be sensed before the second SIM card accesses the network, which can avoid the time consumption increased by invalid network search or reconstruction action, and can effectively improve the efficiency for the second SIM card to access the network after the execution of the first service of the first SIM card is completed, thereby effectively ensuring the use experience of the user.

In some embodiments, as shown in FIG. 5 the communication method in the embodiment of the present disclosure may further include operation S460.

In operation S460, a wireless transmission link for the second SIM card is established or re-established according to the current serving cell of the second SIM card.

The wireless transmission link for the second SIM card is used for connecting the second SIM card and a network device corresponding to the current serving cell of the second SIM card. By establishing the wireless transmission link for the second SIM card, the second SIM card may access the network, thereby implementing the transmission of uplink and downlink data.

The wireless transmission link may include, for example, but is not limited to: Physical Uplink Control Channel (PUCCH), Physical Uplink Shared Channel (PUSCH), Physical Downlink Control Channel (PDCCH), or Physical Downlink Shared Channel (PDSCH).

As an example, the operation that the wireless transmission link for the second SIM card is established or re-established according to the current serving cell of the second SIM card includes: in response to the current serving cell of the second SIM card being an original serving cell and a duration of execution of the first service being less than a target duration, re-establishing an original wireless transmission link that is established based on the original serving cell as the wireless transmission link for the second SIM card.

As another implementation, the operation that the wireless transmission link for the second SIM card is established or re-established according to the current serving cell of the second SIM card includes: in response to the current serving cell of the second SIM card being an original serving cell and a duration of execution of the first service being longer than a target duration, initiating a connection request to the original serving cell to re-establish a wireless transmission link for the second SIM card.

As another implementation, the operation that the wireless transmission link for the second SIM card is established or re-established according to the current serving cell of the second SIM card includes: in response to the current serving cell of the second SIM card not being an original serving cell, initiating a connection request to the current serving cell to re-establish a wireless transmission link for the second SIM card. In some embodiments, the second SIM card may also initiate the connection request to the current serving cell after returning to the idle state.

In the embodiment of the present disclosure, the first SIM card preempts the radio frequency resources in order to perform the first service. Therefore, the operation that the first measurement is performed by using the first SIM card described above may be implemented during the process that the first SIM card performs the first service.

In view of this, the communication method in the embodiment of the present disclosure may further include an operation of performing the first service. The operation of performing the first service may specifically include the following two operations.

1. The terminal device accesses the serving cell by using the radio frequency resource of the terminal device. After the terminal device accesses the serving cell, the terminal device may establish a wireless transmission link with a network device to perform the first service. After the terminal device accesses the wireless network, the terminal device may also receive a measurement cell set of the first SIM card sent by the accessed network device by using the radio frequency resource. The measurement cell set of the first SIM card may be included in a measurement configuration sent by the network device.

2. A second measurement is performed by using the first SIM card and a second measurement report is generated. The second measurement includes a measurement performed based on the measurement cell set of the first SIM card, and the second measurement report is used for handover of a serving cell of the first SIM card.

An algorithm of the first measurement is not specifically limited in the embodiment of the present disclosure. As an implementation, a measurement period of the first measurement is greater than a measurement period of the second measurement, i.e., the first measurement is a low density measurement compared with the second measurement. The low density measurement may be understood as that in the first measurement, the first SIM card may schedule a measurement target (i.e., the measurement cell set of the second SIM card) configured by the second SIM card in a manner of low density scheduling.

As another implementation, the measurement period of the first measurement may be less than or equal to the measurement period of the second measurement. The first measurement is also called a high density measurement when the measurement period of the first measurement is less than the measurement period of the second measurement. By performing the first measurement in a manner of the high density measurement, the accuracy of the first measurement can be ensured.

In some embodiments, the priority of the first measurement may be less than the priority of the second measurement to prioritize the execution of the first service.

In some embodiments, the priority of the first measurement may be greater than or equal to the priority of the second measurement to ensure execution of the first measurement.

The Radio Access Technologies (RATs) of the serving cell to which the first SIM card and the second SIM card have access are not specifically limited in the embodiments of the present disclosure.

For example, an RAT of the serving cell to which the first SIM card has access is the same as an RAT of the serving cell to which the second SIM card has access. Exemplarily, the RAT of the serving cell to which the first SIM card and the second SIM card have access is NR or LTE.

As another example, the RAT to which the first SIM card has access may be different from the wireless RAT to which the second SIM card has access. Exemplarily, the RAT of the serving cell to which the first SIM card has access is NR, and the RAT of the serving cell to which the second SIM card has access is LTE. Optionally, the RAT of the serving cell to which the first SIM card has access is LTE, and the wireless RAT of the serving cell to which the first SIM card has access is NR.

In view of this, in some embodiments, the first measurement is performed by performing an Inter-Radio Access Technology (inter-RAT) measurement using the first SIM card in response to the RAT of the serving cell where the first SIM card has access being different from the RAT of an original serving cell where the second SIM card has access.

Figure 6:
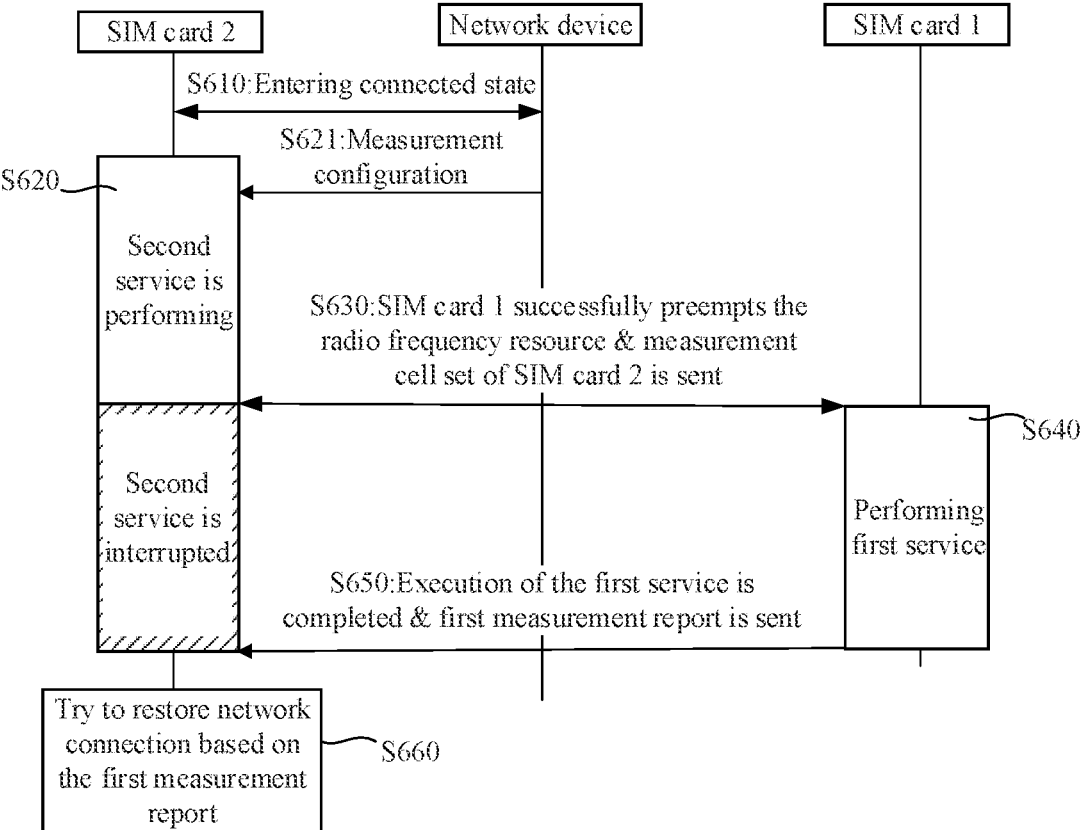
FIG. 6 is a schematic flowchart of a communication method according to another embodiment of the present disclosure.

In order to facilitate understanding of the embodiment of the present disclosure, the communication method in the embodiment of the present disclosure is used for performing the network restoration after interruption of a second service of a second SIM card in a dual-SIM dual-standby terminal device, which is exemplarily described with reference to of FIG. 6 below:

With reference to FIG. 6, the communication method includes operations S610 to S660.

In operation S610, the second SIM card enters a connected state.

Specifically, the second SIM card communicates with a network device by using a radio frequency resource in response to a request for a second service, so that the second SIM card enters the connected state.

In operation S620, the second SIM card performs the second service.

The operation S620 may also include an operation S621 that the second SIM card receives a measurement configuration sent by the network device. The measurement configuration is used for cell measurement, and the measurement configuration includes a measurement cell set of the second SIM card.

In operation S630, in response to the first SIM card successfully preempting the radio frequency resource, the measurement cell set of the second SIM card is sent to the first SIM card.

The measurement cell set of the second SIM card includes an original serving cell of the second SIM card and neighbor cells of the original serving cell.

The operation S630 may be executed in the process of performing the second service. Specifically, the terminal device receives the request for the first service from the first SIM card. If the priority of the first service is higher than the priority of the second service, the terminal device enables the first SIM card to preempt the radio frequency resource used by the second SIM card, which causes the first SIM card to enter the connected state while interrupting the second service.

In operation S640, the first SIM card performs the first service.

The process that the first SIM card performs the first service may also include performing the first measurement and the second measurement, and generating the first measurement report and the second measurement report.

In operation S650, the first measurement report is sent to the second SIM card in response to execution of the first service being completed.

In operation S660, network connection for the second SIM card is tried to be restored based on the first measurement report.

The specific strategy of the restoration may be as follows.
1. If an original serving cell of the second SIM card has a poor signal quality (for example, RSRP is less than the set threshold or S<0), etc.), the connection with the original serving cell is not tried to be restored in subsequent actions. For example, the original wireless transmission link for the uplink and downlink transmission is not tried to be restored on the original serving cell: or the original serving cell is not considered when performing the network search and camp.
2. When a cell other than the original serving cell is tried to be camped on, the first measurement report returned by the first SIM card may be referred. If there are cells having better signal qualities (the RSRP is greater than the set threshold or S>0) in the first measurement report, the cells are ordered and one of the ordered cells is selected to camp on. If there is no cell that may be camped on in the first measurement report, the second SIM card ignores these frequency points/cells and searching other cells.

According to the method in the embodiment of the present disclosure, when the network connection for the second SIM card is restored, if the signal quality of the original serving cell is found to be poor, the second SIM card does not take a long time in the uplink and downlink restoration, but directly performs cell camp. Moreover, according to the method, during the stage of performing search and camp for the second SIM card, the second SIM card selects the optimal cell to camp on and ignores the frequency points/cells with poor signals according to the first measurement report. Therefore, the method can reduce the time consumption for the second SIM card to restore the network and thus effectively improve the use experience of the users.

The method embodiments of the present disclosure are described in detail above with reference to FIG. 1 to FIG. 6, and device embodiments of the present disclosure are described in detail below with reference to FIG. 7 to FIG. 8. It should be understood that the description of the method embodiments correspond to the description of the device embodiments and therefore portions not described in detail in the device embodiments may refer to the preceding method embodiments.

Figure 7:
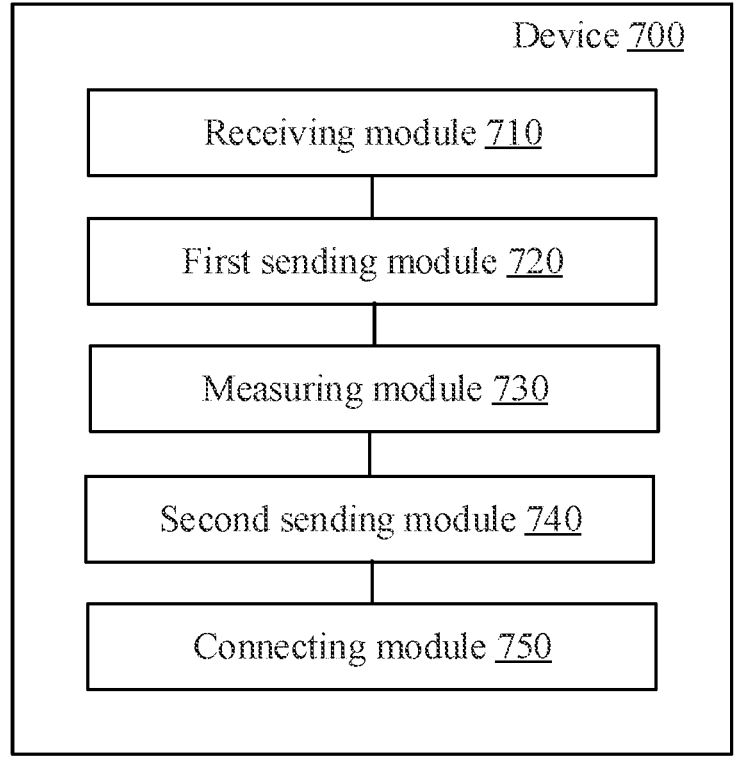
FIG. 7 is a schematic structural diagram of a communication device according to an embodiment of the present disclosure.
Figure 8:
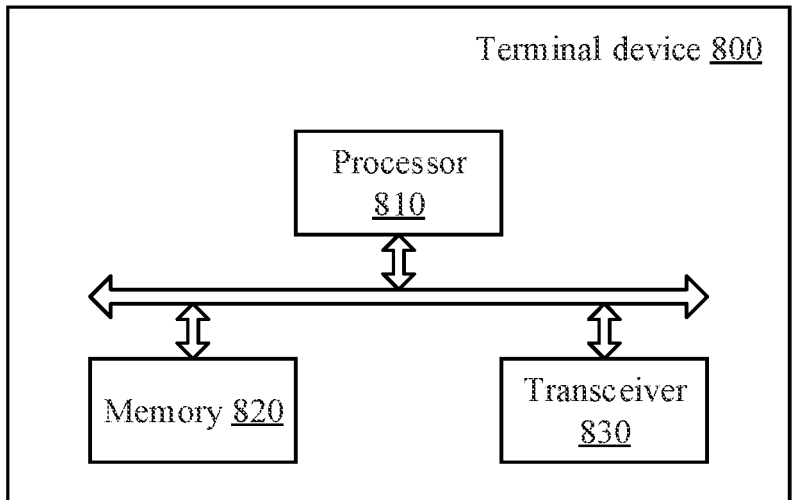
FIG. 8 is a schematic structural diagram of a terminal device according to an embodiment of the present disclosure.

FIG. 7 is a schematic structural diagram of a communication device according to an embodiment of the present disclosure. The communication device 700 may be applied to a terminal device. The terminal device includes a first SIM card and a second SIM card.

The communication device 700 may include a receiving module 710, a first sending module 720, a measuring module 730, a second sending module 740 and a connecting module 750.

The receiving module 710 is configured to receive a request for a first service from the first SIM card.

The first sending module 720 is configured to send a measurement cell set of the second SIM card to the first SIM card in response to the first SIM card needing to preempt a radio frequency resource used by the second SIM card.

The measuring module 730 is configured to perform a first measurement by using the first SIM card and generate a first measurement report. The first measurement includes a measurement performed based on the measurement cell set of the second SIM card.

The second sending module 740 is configured to send the first measurement report to the second SIM card in response to execution of the first service being completed.

The connecting module 750 is configured to determine a current serving cell of the second SIM card according to the first measurement report.

Optionally, the receiving module 710 is further configured to receive, by using a radio frequency resource of the terminal device, a measurement cell set of the first SIM card sent by a network device. The measuring module 730 is further configured to perform a second measurement by using the first SIM card and generate a second measurement report, where the second measurement includes a measurement performed based on the measurement cell set of the first SIM, and the second measurement report is used for handover of a serving cell of the first SIM card.

Optionally, a priority of the second measurement is higher than a priority of the first measurement.

Optionally, a measurement period of the first measurement is greater than a measurement period of the second measurement.

Optionally, the connecting module 750 is further configured to: before the step of in response to the first SIM card needing to preempt the radio frequency resource of the terminal device, occupy the radio frequency resource of the terminal device by using the second SIM card to establish an original wireless transmission link for the second SIM card, where the original wireless transmission link is used for performing a second service; and in response to a priority of the first service being higher than a priority of the second service, determine that the first SIM card needs to preempt the radio frequency resource used by the second SIM card.

Optionally, the connecting module 750) is further configured to establish or re-establish a wireless transmission link for the second SIM card according to the current serving cell of the second SIM card.

Optionally, the first measurement report includes signal quality of an original serving cell of the second SIM card, and the connecting module 750 is configured to: determine whether the signal quality of the original serving cell of the second SIM card satisfies a preset condition according to the first measurement report; determine the original serving cell as the current serving cell of the second SIM card in response to the signal quality of the original serving cell of the second SIM card satisfying the preset condition; and determine the current serving cell of the second SIM card among cells other than the original serving cell in response to the signal quality of the original serving cell of the second SIM card not satisfying the preset condition.

Optionally, the first measurement report further includes signal qualities of neighbor cells of the original serving cell of the second SIM card, and the connecting module 750 is configured to: determine whether the signal quality of each of the neighbor cells of the original serving cell satisfies a preset condition; in response to the signal qualities of the neighbor cells of the original serving cell satisfying the preset condition, determine the current serving cell of the second SIM card among the neighbor cells of the original serving cell; and in response to the signal qualities of the neighbor cells of the original serving cell not satisfying the preset condition, search cells other than the original serving cell and the neighbor cells of the original serving cell, and determine the current serving cell of the second SIM card among the cells other than the original serving cell and the neighbor cells of the original serving cell.

Optionally, the connecting module 750 is configured to: in response to the current serving cell of the second SIM card being an original serving cell and a duration of execution of the first service being less than a target duration, re-establish an original wireless transmission link that is established based on the original serving cell as the wireless transmission link for the second SIM card.

Optionally, the measuring module 730 is configured to perform the first measurement by performing an Inter-Radio Access Technology (inter-RAT) measurement using the first SIM card in response to an RAT of a serving cell to which the first SIM card has access being different from an RAT of an original serving cell to which the second SIM card has access.

Optionally, the measurement cell set of the second SIM card is contained in a measurement configuration or a System Information Block (SIB) received by the second SIM card from a network device.

A terminal device 800 in the embodiment of the present disclosure is described below with reference to FIG. 8. The terminal device 800 may be configured to implement the method described above in the method embodiments applied to the terminal device.

It should be understood that the terminal device 800 may be applied to any of the types of terminal devices mentioned above.

The terminal device 800 may include one or more processors 810. The processor 810 may support the terminal device 800 to implement the methods described in the method embodiments applied to the terminal device.

The processor 810 may be a general purpose processor or a dedicated processor. For example, the processor may be a central processing unit (CPU). Optionally, the processor may also be another general purpose processor, a digital signal processor (DSP), an application specific integrated circuit (ASIC), a field programmable gate array (FPGA) or other programmable logic devices, a discrete gate or transistor logic device, a discrete hardware component, etc. The general purpose processor may be a microprocessor or the processor may be any conventional processor, etc.

The terminal device 800 may also include one or more memories 820. Each memory 820 stores a program that can be executed by the processor 810 to control the terminal device 800 to perform the method described in the method embodiments applied to the terminal device. The memory 820 may be independent of the processor 810 or may be integrated into the processor 810.

The terminal device 800 may also include a transceiver 830. The processor 810 may communicate with other devices through the transceiver 830. For example, the processor 810 may send data to and receive data from other devices through the transceiver 830.

The embodiment of the present disclosure further provides a chip including a processor configured to invoke and execute a computer program from a memory, to enable a device on which the chip is mounted to perform the methods described in the method embodiments. It will be understood that the processor may be any of the types of the processors mentioned above. It can be understood that the memory may be independent of the chip or integrated into the chip.

The embodiment of the present disclosure also provides a machine-readable storage medium configured to store programs that cause a computer to perform the methods in various embodiments of the present disclosure.

The embodiment of the present disclosure also provides a computer program product including programs that cause a computer to perform the methods in various embodiments of the present disclosure.

The above-described embodiments may be implemented in whole or in part by software, hardware, firmware or any combination thereof. When implemented in software, they may be implemented in whole or in part in the form of a computer program product. The computer program product includes one or more computer instructions. When the computer program instructions are loaded and executed on a computer, the flows or functions according to the embodiments of the disclosure are generated in whole or in part. The computer may be a general purpose computer, a dedicated computer, a computer network, or other programmable devices. The computer instructions may be stored in a computer-readable storage medium or transmitted from one computer-readable storage medium to another. For example, the computer instructions may be transmitted from one Web site, computer, server, or data center to another Web site, computer, server, or data center in a wired (e.g. coaxial cable, optical fiber, digital subscriber line (DSL)) manner or wireless (e.g. infrared, wireless, microwave, etc.) manner. The computer-readable storage medium may be any available medium that a computer may access or a data storage device such as a server, a data center, or the like that contains one or more integrations of available medium. The available medium may be magnetic medium (e.g. floppy disk, hard disk, magnetic tape), optical medium (e.g. DVD), or semiconductor medium (e.g. Solid State Disk (SSD)), etc.

Those of ordinary skill in the art may realize that the unit and algorithm [00147] operations of each example described in combination with the embodiments disclosed herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation is not considered to be beyond the scope of the present disclosure.

In several embodiments provided by the present disclosure, it should be understood that the disclosed systems, devices and methods may be realized in other ways. For example, the embodiment of the device described above is only schematic. For example, the division of the unit is only a logical functional division, and there may be another division method in the actual implementation, for example, multiple units or components may be combined or integrated into another system, or some features may be ignored or not implemented. On the other hand, the mutual coupling or direct coupling or communication connection illustrated or discussed may be indirect coupling or communication connection through some interfaces, devices or units, and may be electrical, mechanical or other forms.

The unit described as a separation part may or may not be physically separated, and the component displayed as a unit may or may not be a physical unit, that is, it may be located in one place, or it may be distributed to multiple network units. Some or all of the units may be selected according to the actual requirements to achieve the purpose of the embodiment.

In addition, each functional unit in each embodiment of the present disclosure may be integrated into one processing unit, each unit may exist physically alone, or two or more units may be integrated into one unit.

The above are only the specific embodiments of the disclosure, but the scope of protection of the disclosure is not limited thereto. Any person skilled in the art may easily think of variations or substitutions made within the technical scope of the disclosure. Therefore, the protection scope of the disclosure shall be subject to the protection scope of the claims.

What is claimed is:

1. A method of communication, applied to a terminal device comprising a first Subscriber Identity Module (SIM) card and a second SIM card, wherein the method comprises:

receiving a request for a first service from the first SIM card;

in response to the first SIM card needing to preempt a radio frequency resource used by the second SIM card, sending a measurement cell set of the second SIM card to the first SIM card;

performing a first measurement by using the first SIM card and generating a first measurement report, wherein the first measurement comprises a measurement performed based on the measurement cell set of the second SIM card;

sending the first measurement report to the second SIM card in response to execution of the first service being completed; and determining a current serving cell of the second SIM card according to the first measurement report.

2. The method of claim 1, further comprising:

receiving, by using a radio frequency resource of the terminal device, a measurement cell set of the first SIM card sent by a network device; and performing a second measurement by using the first SIM card and generating a second measurement report, wherein the second measurement comprises a measurement performed based on the measurement cell set of the first SIM, and the second measurement report is used for handover of a serving cell of the first SIM card.

3. The method of claim 2, wherein a priority of the second measurement is higher than a priority of the first measurement.

4. The method of claim 2, wherein a measurement period of the first measurement is greater than a measurement period of the second measurement.

5. The method of claim 1, wherein before the step of in response to the first SIM card needing to preempt the radio frequency resource used by the second SIM card, the method further comprises:

occupying, by using the second SIM card, a radio frequency resource of the terminal device to establish an original wireless transmission link for the second SIM card, wherein the original wireless transmission link is used for performing a second service; and in response to a priority of the first service being higher than a priority of the second service, determining that the first SIM card needs to preempt the radio frequency resource used by the second SIM card.

6. The method of claim 1, further comprising:

establishing or re-establishing a wireless transmission link for the second SIM card according to the current serving cell of the second SIM card.

7. The method of claim 1, wherein the first measurement report comprises signal quality of an original serving cell of the second SIM card, and wherein determining the current serving cell of the second SIM card according to the first measurement report comprises:

determining whether the signal quality of the original serving cell of the second SIM card satisfies a preset condition according to the first measurement report;

determining the original serving cell as the current serving cell of the second SIM card in response to the signal quality of the original serving cell of the second SIM card satisfying the preset condition; and determining the current serving cell of the second SIM card among cells other than the original serving cell in response to the signal quality of the original serving cell of the second SIM card not satisfying the preset condition.

8. The method of claim 7, wherein the first measurement report further comprises signal qualities of neighbor cells of the original serving cell of the second SIM card, and wherein determining the current serving cell of the second SIM card among the cells other than the original serving cell comprises:

determining whether the signal quality of each of the neighbor cells of the original serving cell satisfies a preset condition;

in response to the signal qualities of the neighbor cells of the original serving cell satisfying the preset condition, determining the current serving cell of the second SIM card among the neighbor cells of the original serving cell; and in response to the signal qualities of the neighbor cells of the original serving cell not satisfying the preset condition, searching cells other than the original serving cell and the neighbor cells of the original serving cell, and determining the current serving cell of the second SIM card among the cells other than the original serving cell and the neighbor cells of the original serving cell.

9. The method of claim 6, wherein establishing or re-establishing the wireless transmission link for the second SIM card according to the current serving cell of the second SIM card comprises:

in response to the current serving cell of the second SIM card being an original serving cell and a duration of execution of the first service being less than a target duration, re-establishing an original wireless transmission link established based on the original serving cell as the wireless transmission link for the second SIM card.

10. The method of claim 1, wherein performing the first measurement by using the first SIM card comprises:

performing the first measurement by performing an Inter-Radio Access Technology (inter-RAT) measurement using the first SIM card in response to an RAT of a serving cell to which the first SIM card has access being different from an RAT of an original serving cell to which the second SIM card has access.

11. The method of claim 1, wherein the measurement cell set of the second SIM card is contained in a measurement configuration or a System Information Block (SIB) received by the second SIM card from a network device.

12. A device of communication, applied to a terminal device comprising a first Subscriber Identity Module (SIM) card and a second SIM card, wherein the device comprises:

a transceiver, configured to receive a request for a first service from the first SIM card; and send a measurement cell set of the second SIM card to the first SIM card in response to the first SIM card needing to preempt a radio frequency resource used by the second SIM card; and a processor, configured to perform a first measurement by using the first SIM card and generate a first measurement report, wherein the first measurement comprises a measurement performed based on the measurement cell set of the second SIM card;

the transceiver being further configured to send the first measurement report to the second SIM card in response to execution of the first service being completed; and the processor being further configured to determine a current serving cell of the second SIM card according to the first measurement report.

13. The device of claim 12, wherein the transceiver is further configured to receive, by using a radio frequency resource of the terminal device, a measurement cell set of the first SIM card sent by a network device; and the processor is further configured to perform a second measurement by using the first SIM card and generating a second measurement report, wherein the second measurement comprises a measurement performed based on the measurement cell set of the first SIM, and the second measurement report is used for handover of a serving cell of the first SIM card.

14. The device of claim 13, wherein a priority of the second measurement is higher than a priority of the first measurement, wherein a measurement period of the first measurement is greater than a measurement period of the second measurement.

15. The device of claim 12, wherein the processor is further configured to: before the step of in response to the first SIM card needing to preempt the radio frequency resource used by the second SIM card, occupy, by using the second SIM card, a radio frequency resource of the terminal device to establish an original wireless transmission link for the second SIM card, wherein the original wireless transmission link is used for performing a second service; and in response to a priority of the first service being higher than a priority of the second service, determine that the first SIM card needs to preempt the radio frequency resource used by the second SIM card.

16. The device of claim 12, wherein the processor is further configured to:

establish or re-establish a wireless transmission link for the second SIM card according to the current serving cell of the second SIM card.

17. The device of claim 12, wherein the first measurement report comprises signal quality of an original serving cell of the second SIM card, and the processor is configured to:

determine whether the signal quality of the original serving cell of the second SIM card satisfies a preset condition according to the first measurement report;

determine the original serving cell as the current serving cell of the second SIM card in response to the signal quality of the original serving cell of the second SIM card satisfying the preset condition; and determine the current serving cell of the second SIM card among cells other than the original serving cell in response to the signal quality of the original serving cell of the second SIM card not satisfying the preset condition.

18. The device of claim 17, wherein the first measurement report further comprises signal qualities of neighbor cells of the original serving cell of the second SIM card, and the processor is configured to:

determine whether the signal quality of each of the neighbor cells of the original serving cell satisfies a preset condition;

in response to the signal qualities of the neighbor cells of the original serving cell satisfying the preset condition, determine the current serving cell of the second SIM card among the neighbor cells of the original serving cell; and in response to the signal qualities of the neighbor cells of the original serving cell not satisfying the preset condition, search cells other than the original serving cell and the neighbor cells of the original serving cell, and determine the current serving cell of the second SIM card among the cells other than the original serving cell and the neighbor cells of the original serving cell.

19. The device of claim 16, wherein the processor is specifically configured to:

in response to the current serving cell of the second SIM card being an original serving cell and a duration of execution of the first service being less than a target duration, re-establish an original wireless transmission link established based on the original serving cell as the wireless transmission link for the second SIM card.

20. A non-transitory computer-readable storage medium, having executable code stored thereon, wherein the code, when executed by a terminal device comprising a first Subscriber Identity Module (SIM) card and a second SIM card, causes the terminal device to implement the following:

receiving a request for a first service from the first SIM card;

in response to the first SIM card needing to preempt a radio frequency resource used by the second SIM card, sending a measurement cell set of the second SIM card to the first SIM card;

performing a first measurement by using the first SIM card and generating a first measurement report, wherein the first measurement comprises a measurement performed based on the measurement cell set of the second SIM card;

sending the first measurement report to the second SIM card in response to execution of the first service being completed; and determining a current serving cell of the second SIM card according to the first measurement report.

* * * * *